June 18, 1935.  W. J. MERRIGAN  2,005,101
LATHE
Filed Sept. 26, 1934
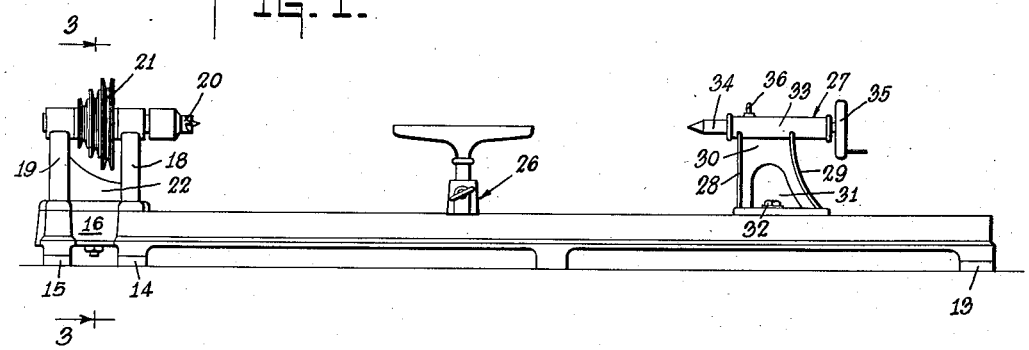
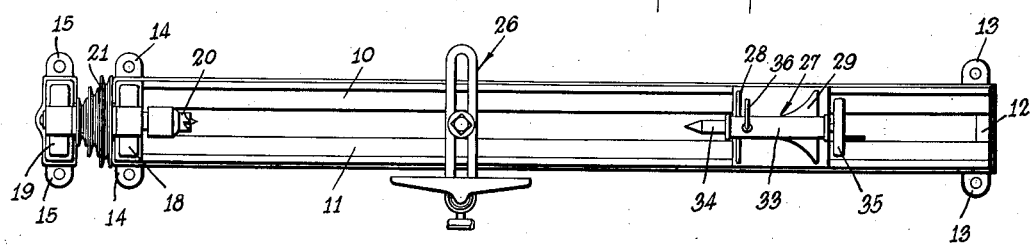
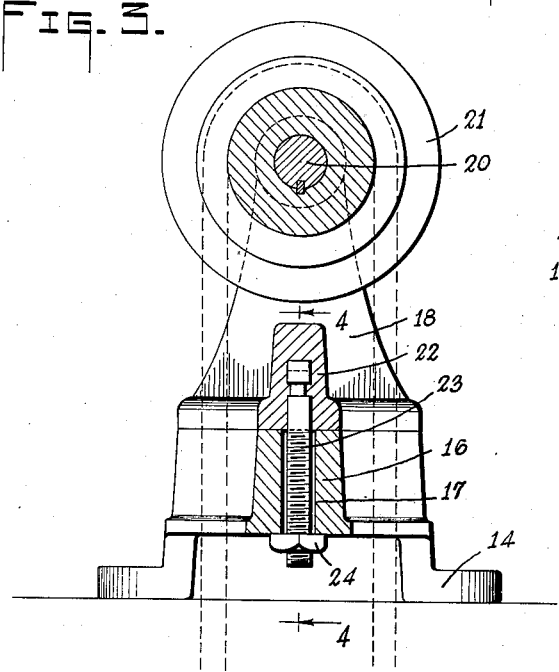
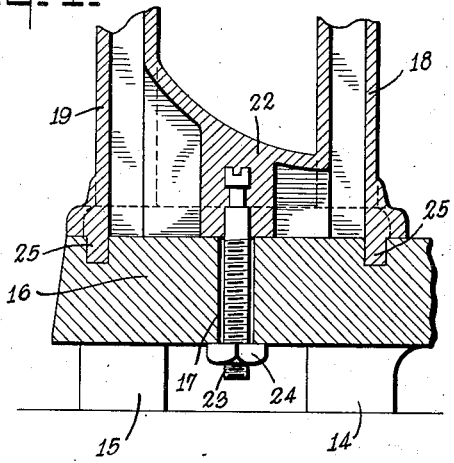
Inventor
W. J. Merrigan
by Hazard and Miller
Attorneys.

Patented June 18, 1935

2,005,101

UNITED STATES PATENT OFFICE 2,005,101

LATHE

William J. Merrigan, Los Angeles, Calif., assignor to Herberts Machinery Co., Ltd., Los Angeles, Calif., a corporation of California Application September 26, 1934, Serial No. 745,593

3 Claims. (Cl. 142—1)

This invention relates to improvements in lathes and, particularly, to woodworking lathes, although the invention is susceptible of use on other types of lathes.

An object of the invention is to provide a construction which will be relatively easy and cheap to manufacture and which will be very durable.

The present invention particularly concerns improvements in the headstock of the lathe. In small woodworking lathes designed for home use or use in pattern shops and the like it is desirable in many instances to be able to drive the spindle of the headstock from a motor or source of power located beneath the table or work bench on which the lathe is mounted. In prior constructions the headstock in woodworking lathes of this character is a relatively large casting having openings in its sides rendering it inconvenient, if at all possible, to run the belt from the pulley on the headstock spindle down beneath the lathe. In most constructions the arrangement of the headstock is such that the headstock spindle must be driven by a motor or other source of power located otherwise than beneath the headstock.

Another object of the present invention is to provide a lathe wherein the headstock spindle can be driven by a belt drive from a motor below the table on which the lathe is mounted and which is of such design as to readily permit of a changing of the belt drive from one pulley to another to vary the speed of rotation of the headstock spindle.

Another object of the invention is to provide a headstock of novel, simple, and durable design, the parts of which can be easily, quickly, and cheaply manufactured and readily assembled.

With the foregoing and other objects in view, which will be made manifest in the following detailed description, and specifically pointed out in the appended claims, reference is had to the accompanying drawing for an illustrative embodiment of the invention, wherein:

Fig. 1 is a view in side elevation of the improved woodworking lathe.

Fig. 2 is a top plan view of the lathe shown in Fig. 1.

Fig. 3 is a sectional view taken substantially upon the line 3—3 upon Fig. 1.

Fig. 4 is a partial view in vertical section taken substantially upon the line 4—4 upon Fig. 3.

Referring to the accompanying drawing, wherein similar reference characters designate similar parts throughout, the lathe consists of a bed providing rails 10 and 11 which are connected at their ends as indicated at 12. At one end of the bed there are provided laterally extending ears 13 and at the opposite end of the bed, which constitutes the headstock end, there are provided pairs of ears. The ears of one pair, indicated at 14, and the ears of the other pair, indicated at 15, are joined by a central connecting web 16 in which there is formed an aperture 17. On top of the headstock end of the bed there is disposed the headstock. This is formed of an integral casting providing standards 18 and 19 in the tops of which there are provided bearings for a headstock spindle 20. A multiple sheave or cone pulley 21 is fastened on the spindle between the bearings. A web 22 is formed integral with the standards 18 and 19 and the bottoms of the standards and the web are widened or flanged so as to fit smoothly on complementary portions of the bed. As a means for fastening the headstock on the bed a bolt or stud 23 has its upper end cast in web 22. This can be easily formed when the casting of the headstock is in the nature of a die casting, although if the headstock is otherwise formed this bolt may be attached in any suitable manner. The bolt or stud extends downwardly from the center of the headstock through aperture 17 and is provided with a nut 24. At the ends of the headstock casting small lugs 25 project downwardly therefrom, which fit into corresponding recesses in the lathe bed. As will be noted from an inspection of Fig. 3, both the bed web 16 and the headstock web 22 are narrower than the sheaves on the cone pulley 21 and the space between the standards is laterally open from opposite sides of these webs. With such an arrangement it is possible to fasten the lathe on a table or work bench by driving bolts or screws through the ears 13, 14 and 15. A hole or holes may be cut in the table or work bench to accommodate the reaches of the belt drive indicated in dotted lines on Fig. 3. An electric motor or other source of power may be located beneath the working surface of the table or work bench to drive the headstock spindle. The webs being located between the reaches of the belt in no way interfere with it nor do they require the passing of one reach over an idler pulley which would spread the reaches of the belt. The reaches may be parallel or substantially so, as indicated in Fig. 3, so that a maximum driving contact with pulley 21 can be maintained at all times.

The reference character 26 generally designates a tool rest which is adjustable along the length of the bed. Reference character 27 designates a tailstock. This consists of a pair of standards 28 and 29 connected by a web 30 through which there is formed an aperture 31 for the head of the bolt 32 which, when tightened, holds the tailstock in adjusted position on the rails 10 and 11. At the top of the standards there is a tubular body 33 in which a tailstock spindle 34 is adjusted by means of a hand wheel 35. It is locked in adjusted position by means of a tightening wrench 36.

From the above described construction it will be appreciated that the entire lathe is of extremely simple yet durable design. The construction of the headstock is such as to permit the motor to be located beneath the lathe with a belt drive connecting the headstock spindle with the motor and the reaches of the belt passing downwardly adjacent the sides of webs 22 and 16. As the space between the standards is laterally open from the sides of the webs there is no interfering structure interfering with an easy shift of the belt from one pulley to another.

Various changes may be made in the details of construction without departing from the spirit or scope of the invention as defined by the appended claims.

I claim:

1. A lathe having a bed providing rails, pairs of ears at one end of the bed, a base web connecting the ears, a headstock having a pair of standards one arranged between the ears of each pair, bearings in the standards, a spindle rotatable in the bearings, a pulley on the spindle, a web connecting the standards, and means for fastening the headstock to the base web, both webs being narrower than the pulley.

2. A lathe having a bed providing rails, pairs of ears at one end of the bed, a base web connecting the ears, a headstock having a pair of standards one arranged between the ears of each pair, bearings in the standards, a spindle rotatable in the bearings, a pulley on the spindle, a web connecting the standards, a bolt secured to the web between the standards and extending through an aperture in the base web, and a nut on the bolt, said webs being narrower than the pulley.

3. A lathe having a bed providing rails, pairs of ears at one end of the bed, a base web connecting the ears, a headstock having a pair of standards, one arranged between the ears of each pair, bearings in the standards, a spindle rotatable in the bearings, a multiple sheave pulley on the spindle, a web connecting the standards and arranged over the base web, means for fastening the headstock to the base web, both webs being narrower than the pulley, and the space between the standards being laterally open from the sides of the web.

WILLIAM J. MERRIGAN.